US012807337B2

(12) United States Patent
Reemtsma

(10) Patent No.: US 12,807,337 B2
(45) Date of Patent: Nov. 24, 2026

(54) DRONE WITH JOINTED LEGS

(71) Applicant: Satchel Reemtsma, Berlin (DE)

(72) Inventor: Satchel Reemtsma, Berlin (DE)

( * ) Notice: Subject to any disclaimer, the term of this patent is extended or adjusted under 35 U.S.C. 154(b) by 312 days.

(21) Appl. No.: 18/285,883

(22) PCT Filed: Apr. 13, 2021

(86) PCT No.: PCT/IB2021/053042
§ 371 (c)(1),
(2) Date: Oct. 6, 2023

(87) PCT Pub. No.: WO2022/219371
PCT Pub. Date: Oct. 20, 2022

(65) Prior Publication Data

US 2024/0182190 A1 Jun. 6, 2024

(51) Int. Cl.
*B64U 10/14* (2023.01)
*B64U 20/00* (2023.01)
(Continued)

(52) U.S. Cl.
CPC ............. *B64U 10/14* (2023.01); *B64U 20/00* (2023.01); *B64U 30/21* (2023.01); *B64U 40/20* (2023.01); *B64U 70/92* (2023.01); *B25J 5/00* (2013.01); *B64U 2101/70* (2023.01); *B64U 2201/10* (2023.01); *B64U 2201/20* (2023.01)

(58) Field of Classification Search
CPC ...... B25J 15/0213; B25J 15/026; B25J 15/04; B25J 15/0408; B25J 15/045; B64U 10/13; B64U 10/14; B64U 10/16; B64U 50/37; B64U 50/38; B64U 50/39; B64U 70/90; B64U 80/25
See application file for complete search history.

(56) References Cited

U.S. PATENT DOCUMENTS 9,807,996 B1 11/2017 Yu
10,756,919 B1 8/2020 Kerzner et al.
(Continued)

FOREIGN PATENT DOCUMENTS

EP 2003057 A2 12/2008
WO 2016/193666 A2 12/2016

OTHER PUBLICATIONS

European Patent Office (EPO) Communication under Rule 71(3) EPC (Intention to Grant) for European Patent Application No. 21 721 611.8-1002 (Applicant: Satchel Reemtsma; Title: "Drone with Jointed Legs"), dated Aug. 1, 2024 (8 pages total). Cites: US 2018/0044015 A1 and U.S. Pat. No. 9,807,996 B1.
(Continued)

*Primary Examiner* — Saul Rodriguez
*Assistant Examiner* — Brendan P Tighe
(74) *Attorney, Agent, or Firm* — IP Attorneys Group, LLC

(57) ABSTRACT

The invention relates to a drone, having at least one central body, at least one thrust element, at least one jointed leg, wherein the at least one jointed leg has leg parts which are connected via joints, wherein the at least one jointed leg is connected in an articulated manner via a proximal end to the central body. It is provided according to the invention that a distal end of at least one jointed leg has an exchangeable chuck, via which the distal end of the jointed leg can be connected to a selection of sensor devices and/or gripping devices and/or tools.

13 Claims, 12 Drawing Sheets

(51) Int. Cl.

| | |
|---|---|
| ***B64U 30/21*** | (2023.01) |
| ***B64U 40/20*** | (2023.01) |
| ***B64U 70/92*** | (2023.01) |
| *B25J 5/00* | (2006.01) |
| *B64U 101/70* | (2023.01) |

(56) References Cited

U.S. PATENT DOCUMENTS

| | | | | |
|---|---|---|---|---|
| 2009/0050750 | A1* | 2/2009 | Goossen | B64U 50/14 901/14 |
| 2016/0144734 | A1* | 5/2016 | Wang | B64C 29/0016 701/17 |
| 2018/0044015 | A1 | 2/2018 | Kim et al. | |
| 2018/0127092 | A1 | 5/2018 | del Castillo et al. | |
| 2019/0202560 | A1* | 7/2019 | Bosworth | B64U 50/19 |
| 2019/0321971 | A1* | 10/2019 | Bosworth | B25J 15/0028 |
| 2019/0369641 | A1 | 12/2019 | Gillett | |
| 2021/0070438 | A1 | 3/2021 | Hoshide | |
| 2021/0309388 | A1* | 10/2021 | Ratajczak | B64D 31/00 |

OTHER PUBLICATIONS

International Search Report (ISR) for International Application No. PCT/IB2021/053042, dated Dec. 21, 2021; mailing date Jan. 10, 2022 (3 pages total). Cites: US 2018/0127092 A1, EP 2003057 A2, WO 2016/193666 A2, U.S. Pat. No. 10,756,919 B1, US 2021/0070438 A1, and US 2019/0369641 A1.

International Preliminary Report on Patentability (IPRP) (Chapter II of the PCT / Form PCT/IPEA/409) for International Application No. PCT/IB2021/053042 (Applicant: Satchel Reemtsma), established by the International Preliminary Examining Authority (IPEA) (8 pages total). Cites: US 2018/0127092 A1 (D1), EP 2003057 A2 (D3), and U.S. Pat. No. 10,756,919 B1 (D4).

* cited by examiner

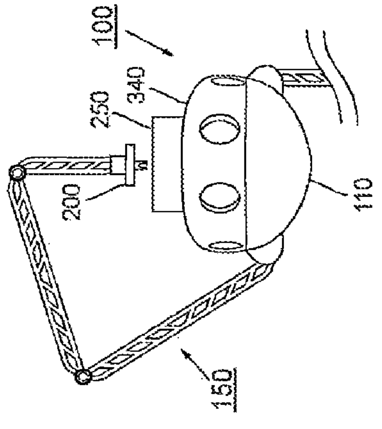
Fig. 12.1
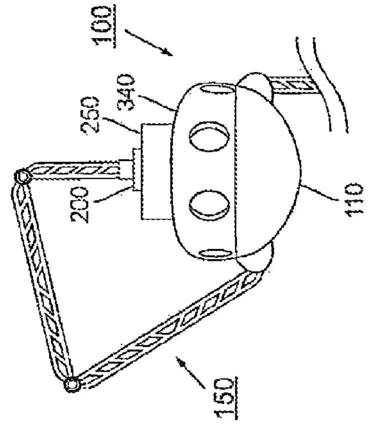
Fig. 12.2
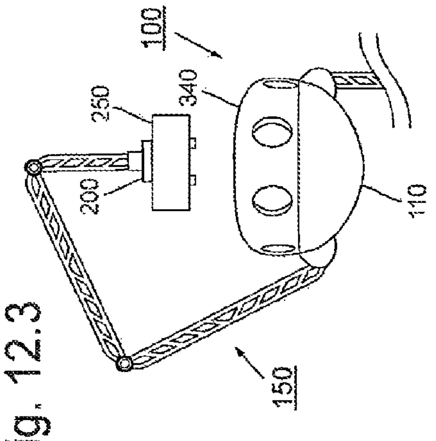
Fig. 12.3
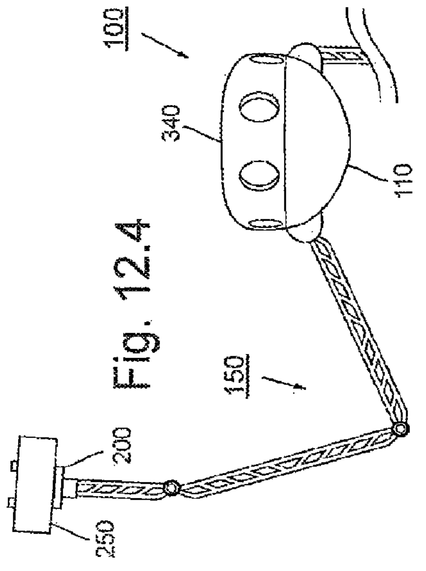
Fig. 12.4
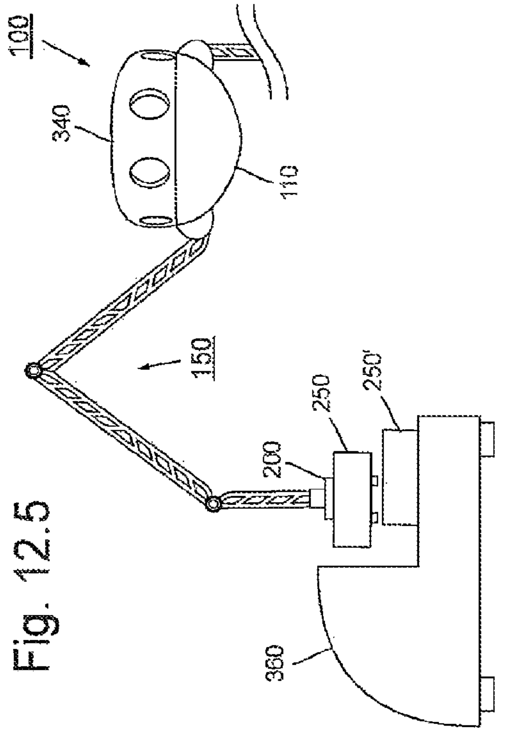
Fig. 12.5

DRONE WITH JOINTED LEGS

CROSS-REFERENCE TO RELATED APPLICATION

This application is a national phase entry of International Application No.: PCT/IB2021/053042, filed on Apr. 13, 2021 and titled "DRONE WITH JOINTED LEGS." The contents of the above-identified Application are relied upon and incorporated herein by reference in their entirety.

FIELD OF THE INVENTION

The invention relates to a drone comprising of at least one central body, a multitude of propeller blades, wherein the propeller blades are rotatably suspended about axes substantially parallel to each other, and wherein the suspensions of the propeller blades are rigidly connected to the central body, a multitude of articulated limbs comprising links connected by joints, wherein the articulated limbs are connected by hinges to the central body via a proximal end.

BACKGROUND OF THE INVENTION

Autonomous devices have been known to be used to monitor cluttered areas and to perform a wide variety of tasks. These autonomous devices are drones, pigs, reptile-like devices, and dog-like devices that, in the manner of a robot, are capable of autonomously performing predetermined tasks, at least in part.

From the publication of US patent application US2018/0127092 A1, a running and flying drone is known. As a hexapod, this has propeller wings that can be folded up on the movable limbs, which, when folded up, point upwards and fit snugly against the limbs. These drones can either run or fly.

The aforementioned publication also refers to Internet videos in which spider-like octapods are presented with a small robot amazingly reminiscent of real large spiders, whose locomotor system mimics the movement of a running spider and can also perform spider-typical threatening gestures. Equipped with microcomputers (Arduino®, RaspBerry®), the small robots mimic the lively nature of a variety of movements that look amazingly natural and real from the outside. These micro robots are intended as toys or as a feasibility study, but they cannot do any tasks themselves, such as switching an electrical device on or off, monitoring a room or building, or moving small objects.

The object of the invention is to provide a small robot that can perform a large number of smaller household tasks, monitoring tasks or data acquisition tasks without human intervention, i.e. without human control.

SUMMARY OF THE INVENTION

The invention is achieved by a drone having the features according to Claim 1. Further advantageous embodiments are specified in the subclaims of Claim 1.

According to the invention, it is provided that a drone of the generic type is provided with at least one thrust element with articulated limbs, in which a distal end of at least one articulated limb has an interchangeable chuck, via which the distal end of the articulated limb can be connected to a selection of sensory devices and/or gripping devices and/or tools.

The drone according to the invention therefore does not have two mutually exclusive modes of movement, namely flying or running, but the at least one thrust element and the articulated limbs can be used independently of one another. It is thus possible to insert both the at least one thrust element and the articulated limbs. For example, in climbing tasks, the drone can generate its force acting on the articulated limbs by pushing the at least one thrust element backwards. It is also possible for the drone to be supported in the air during climbing tasks by the action of the at least one thrust element. Finally, it is also possible for the drone to hold an object under itself when flying with the articulated limbs, similar to a bird of prey or an insect. Yet another possibility for the simultaneous use of the at least one thrust element and the articulated limbs is to transport an object on the upward lying back surface or head surface comparable to the transport of objects by a crab or a crawfish. The use of the at least one thrust element requires a larger amount of energy. The operating time of a drone is therefore limited by the capacity of the carried accumulator/battery and by the weight of the drone including its load. The weight of the accumulator or the battery takes up a considerable proportion of the total weight. The smaller the battery, the higher the possible loading, but the flight time is shortened by the smaller battery on the one hand and by the increased energy consumption due to higher load, the possible flight time is also shortened. In order to save weight, even the smallest weight savings are important. The drone according to the invention therefore has narrow articulated limbs as a lightweight construction with a framework. For this purpose, the articulated limbs consist, for example, of a thin aluminium sheet, which has recesses that give the individual link of an articulated limb an appearance of a truss composite.

In order to increase the variety of uses, it can be provided that at least one link of an articulated limb has an opening angle $\alpha$ of more than 180°. In addition, it is possible for the lengths of individual links and the opening angles $\alpha$ of the joints of the articulated limbs in relation to the dimensions of the central body to be dimensioned such that a distal end of a first articulated limb can be brought as far as a proximal end of a second articulated limb opposite the first articulated foot. This definition is reminiscent of the school maturity test for kindergarteners, who have to grasp their own head with their arm and touch the opposite ear to overcome the first hurdle of school ability. The flexibility achieved by these features in the self-sufficiency of the drone leads to a much larger range of applications compared to a known drone.

BRIEF DESCRIPTION OF THE DRAWINGS

The invention will be explained in more detail with reference to the following figures. These show.

DETAILED DESCRIPTION

Figure 1:
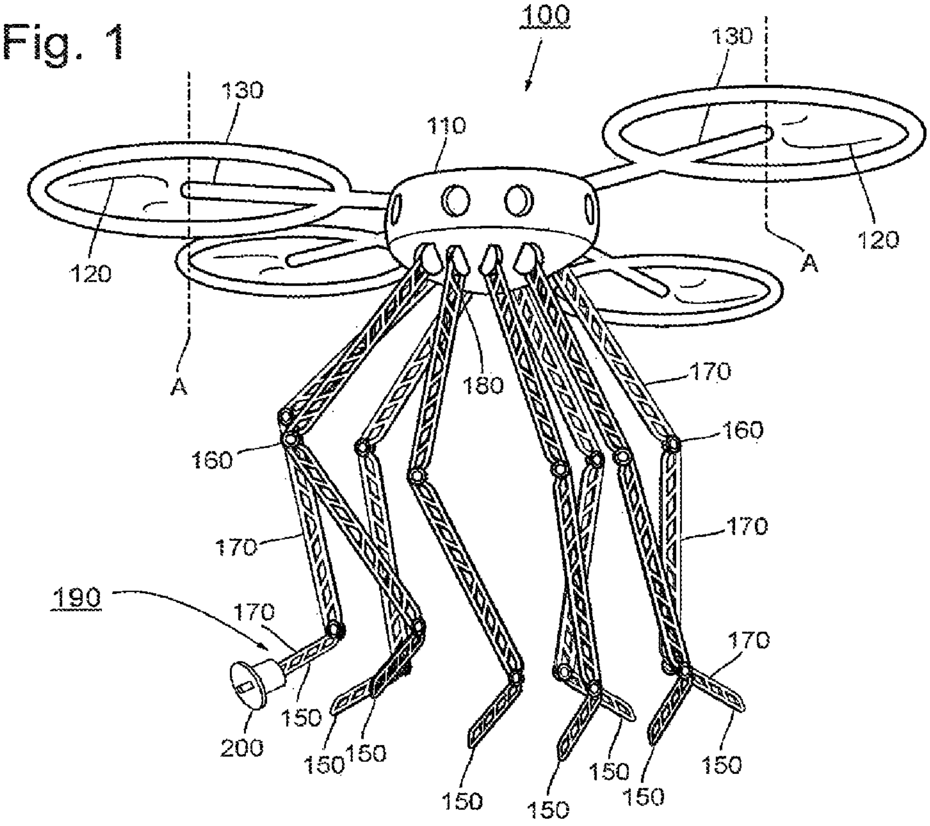
FIG. 1 shows a drone according to the invention with hanging articulated limbs in pure flight operation.

FIG. 1 shows a drone 100 according to the invention with hanging articulated limbs 150 in pure flight mode. The drone 100 has at least one central body 110. A control device S (FIG. 6) is located in this central body 110, and a plurality of propeller wings 120 are provided, which are arranged in a rotating manner in the vicinity of the central body. The propeller wings 120 are suspended so as to rotate about axes A that are substantially parallel to one another. With regard to the flight device in this exemplary embodiment, it is a drone 100 with a rigid suspension 130 of the propeller wings 120. The suspensions 130 of the propeller wings 120 are thus rigidly connected to the central body 110. In this exemplary embodiment variant, it is at least not provided that the position and/or orientation of the suspension is varied dynamically during flight, for example. The drone 100 further includes a plurality of articulated limbs 150. The articulated limbs 150 in turn have links 170 connected via joints 160. The articulated limbs 150 have a proximal end 180 and a distal end 190. The proximal end 180 of the articulated limbs 150 is proximal to the central body 110. The articulated limbs 110 also have a distal end 190. This distal end 190 corresponds to the tip of an insect's foot and is located remote from the central body 110.

According to the idea of the invention, it is provided that a distal end 190 of at least one articulated limb 150 has an interchangeable chuck 200. The distal end 190 may be connected to a selection of sensory devices 210, gripping devices 220, and/or tools 230 by means of the interchangeable chuck 200. Sensory devices 210 may be probes, may be sensing elements, but may also be optical, chemical, or physical sensors for sensing the state of one's environment. The interchangeable chuck makes it possible to save weight and to carry only the necessary functional ballast for the respective application. In the situation shown here, the drone 100 is in pure flight mode with the articulated limbs 150 hanging down. The hanging articulated limbs 150 are not arranged in the downwind of the propeller wings 120, so that the performance of the propeller wings 120 is not reduced by unfavourable aerodynamics.

Figure 2:
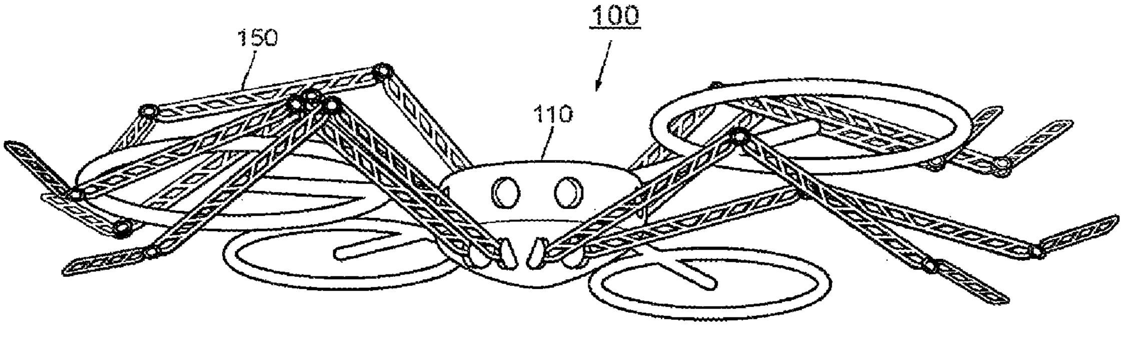
FIG. 2 shows the drone from FIG. 1 in pure crawling mode.

In FIG. 2, the drone 100 from FIG. 1 is shown in pure crawling mode. In crawling mode, it is generally provided that the propeller wings 120 are not switched on and are in the rest position. However, it may be the case that the propeller wings 120 are operated with downward thrust in order to increase the weight of the drone 100, for example in order to press down an object with its own weight, depending on the intended use. However, it is also possible to use the drone 100 with a slight upward thrust in crawling operation, for example, in order to reduce the effect of the inherent weight of the drone 100 on very poorly load-bearing surfaces. This may make sense, for example, if the drone 100 needs to move below a scrub in a swampy area to reach a desired destination.

Figure 3:
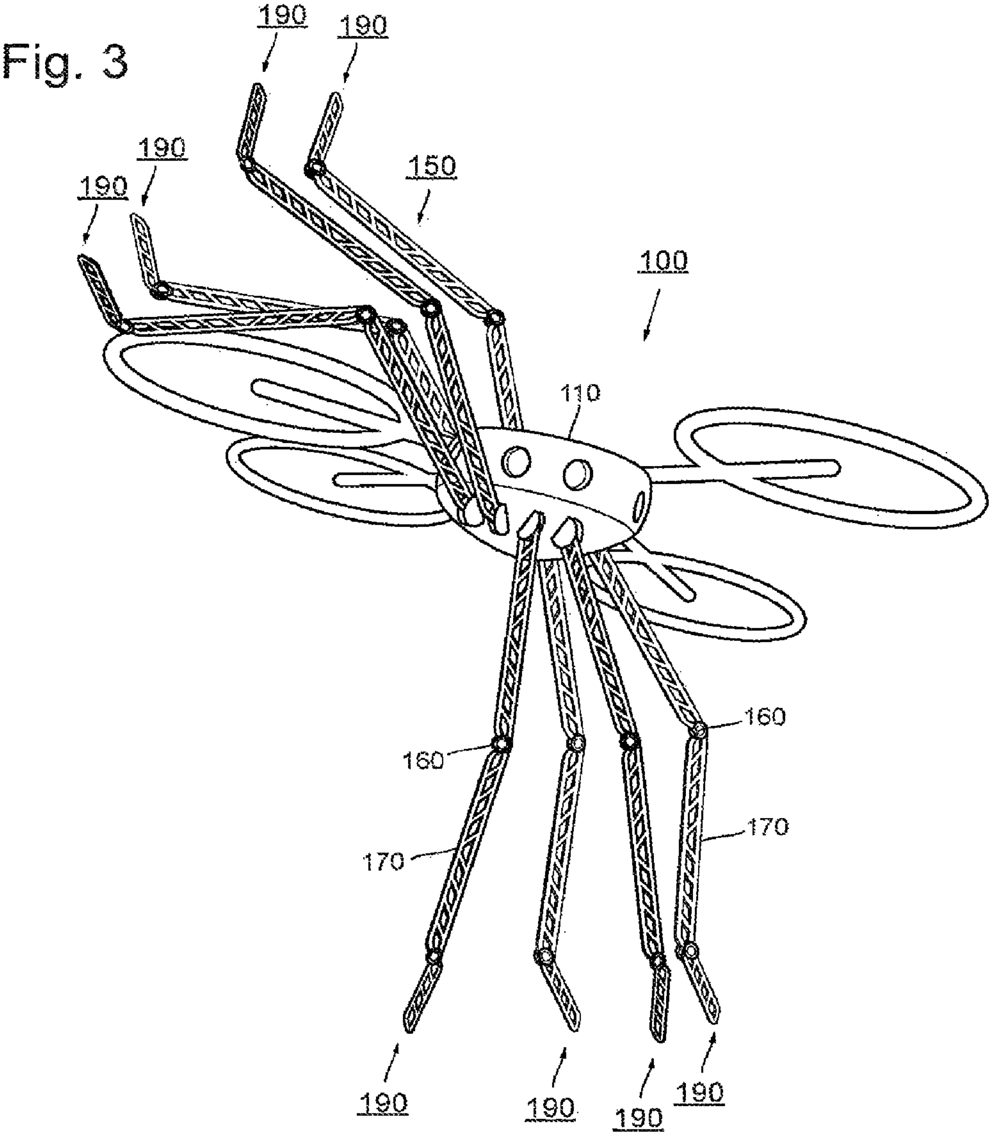
FIG. 3 shows the drone from the above figures in climbing mode as a simultaneous combination of the use of propeller wings and articulated limbs.

In FIG. 3, the drone 100 from the above figures is shown in climbing mode, wherein it uses the propeller wings 120 and uses the articulated limbs 150 in different functions. With a portion of the articulated limbs 150, the drone 100 stands on the distal ends 190 of four articulated limbs 150 on the subfloor. For this purpose, the joints 160 are almost pushed through, which means that the individual links 170 have an angle of about 180°. With four further articulated limbs 150, the drone 100 hangs along an approximately vertical wall (not shown here). To stabilise its position, the drone 100 employs the propeller wings 120.

Figure 4:
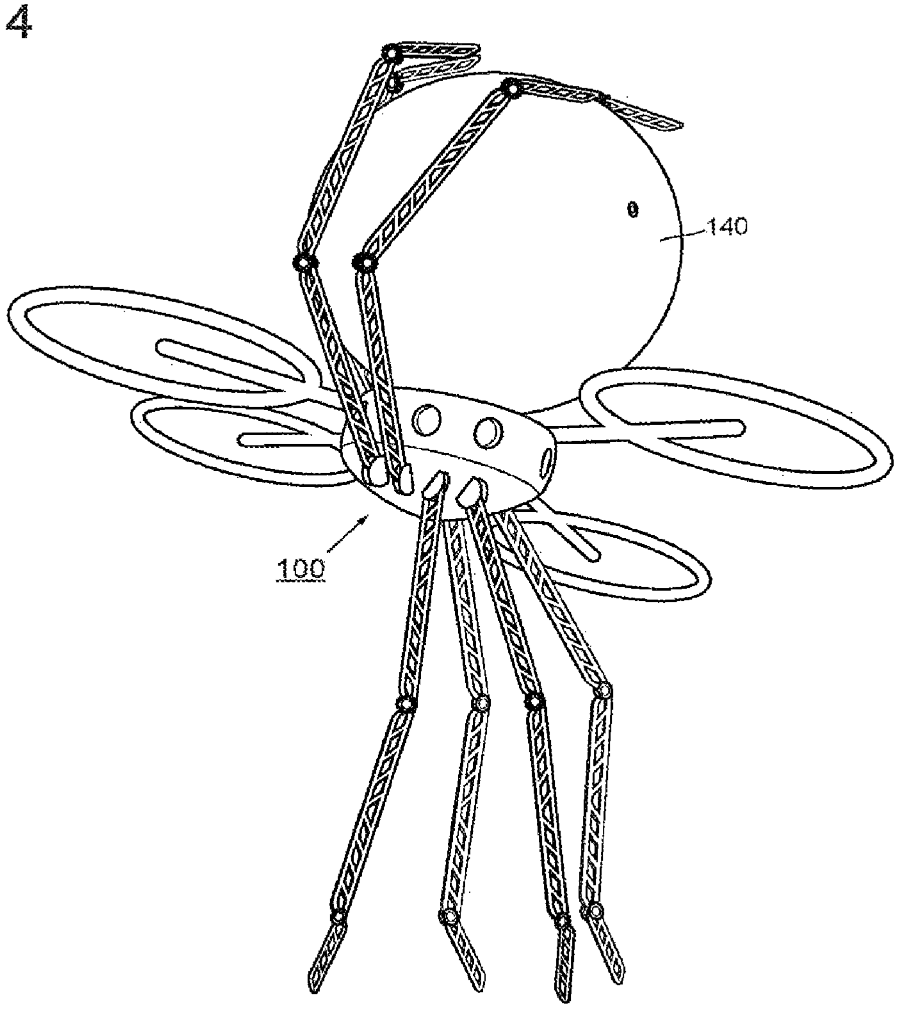
FIG. 4 shows the drone from the above figures with a combined operation mode of the articulated limbs as a manipulator and as a means of locomotion.

In FIG. 4, the drone 100 of the above figures is sketched in a combined operation of the articulated limbs 150 as a manipulator and as a means of locomotion. Here, as an example of an object 140, a portion of the articulated limbs 150 embraces a ball resting on the upward-facing back surface 340 and held by the latter articulated limbs 150. Since the ball does not have an insignificant weight relative to the weight of the lightweight drone 100, the drone 100 stands on the distal ends 190 of four articulated limbs 150 on the subfloor. For this purpose, the joints 160 are almost pushed through, which means that the individual links 170 have an angle of about 180°. To stabilise its position, the drone 100 employs the propeller wings 120 with an upward thrust.

Figure 5:
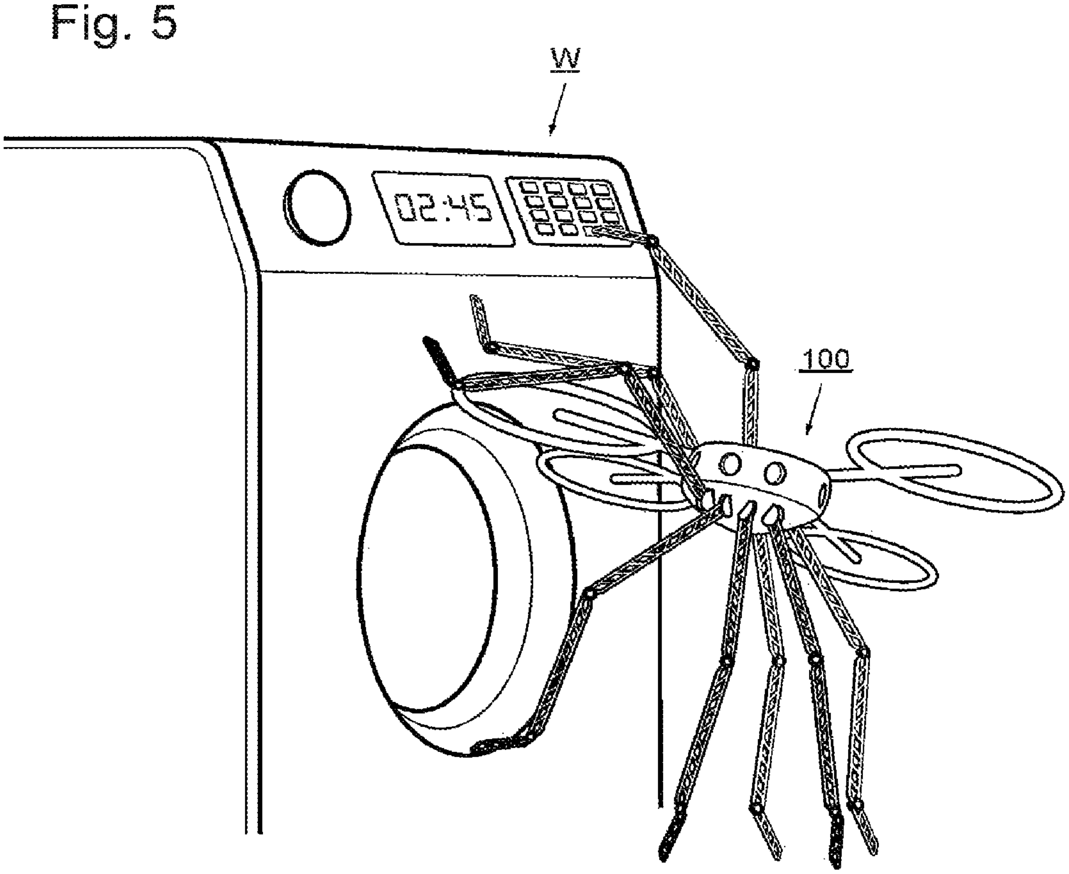
FIG. 5 shows the drone from the above figures in a complex climbing application in a household situation.

In FIG. 5, the drone 100 of the above figures is shown in a complex climbing deployment in a household situation. The situation illustrated herein illustrates the drone 100 in accomplishing the task of changing a washing program of a washing machine W as is typical of a household. With seven articulated limbs 150 here, the drone 100 manages the climbing on the washing machine W, while an eighth articulated foot 150 actuates a switch of the washing machine W. To accomplish the task outlined here, the drone 100, which is connected to the Internet via a base station 350, sends data from a stereo camera 320, which may be enriched with data from a lidar detection device 330, to a remote computer 380. In the present example, the drone 100 sends an image of the washing machine W and an approximate contour of the washing machine W to the remote computer 380 along with a formulated task of changing the program of the washing machine W. An AI-algorithm in the remote computer 380, trained through a variety of comparable tasks of other drones, formulates a control instruction to the drone 100 to press a particular button of the washing machine W. The AI-algorithm overcomes the task of recognizing the type of washing machine W and deriving which button of the washing machine W must be actuated from the task.

Figure 6:
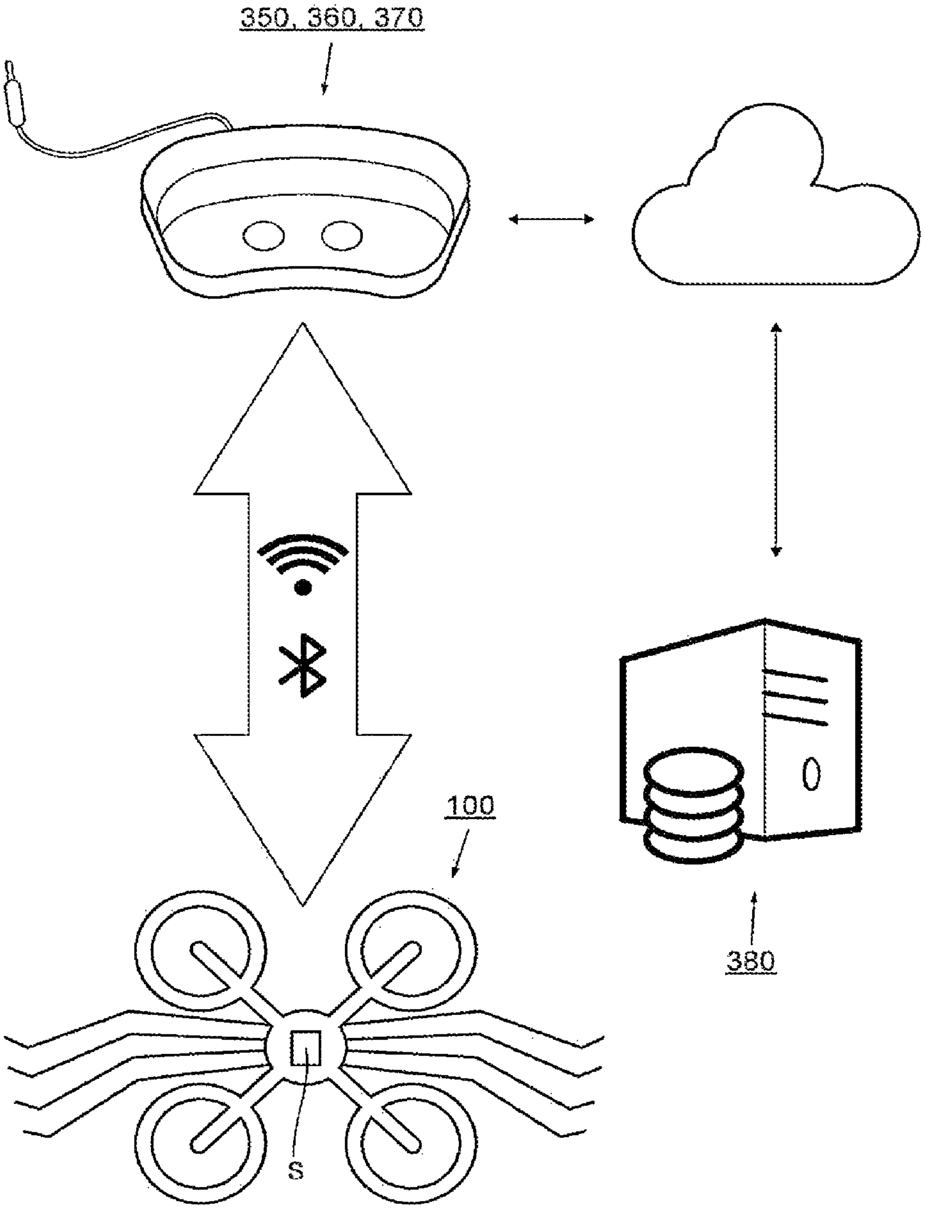
FIG. 6 shows an interaction of a drone according to the invention with a remote control computer via a public communication network.

The elements involved in the interaction of the drone 100 and the remote computer 380 are shown in FIG. 6. This shows an interaction of a drone 100 according to the invention with a remote computer 380 as a control computer via a public communication network. The drone 100 is connected to a base station 350 via WLAN or BlueTooth, the symbols of which are shown in the double arrow. WLAN and BlueTooth are common wireless protocols for household or industry-specific short-range networks at the time of this filing. However, other time-adjusted protocols can be used. The base station 350 acts as a radio relay device 360. In today's jargon: as a WLAN router. The base station 350 may also serve as a charging station 370 for this purpose. Via the radio relay device 360, the drone communicates with a remote computer 380 via the Internet (drawn as a cloud). This remote computer 380 has a higher computing capacity, a database and is primarily connected to a large number of comparable drones in order to "learn" via the feedback from the various drones 100, i.e. to adapt its AI-algorithm independently.

Figure 7:
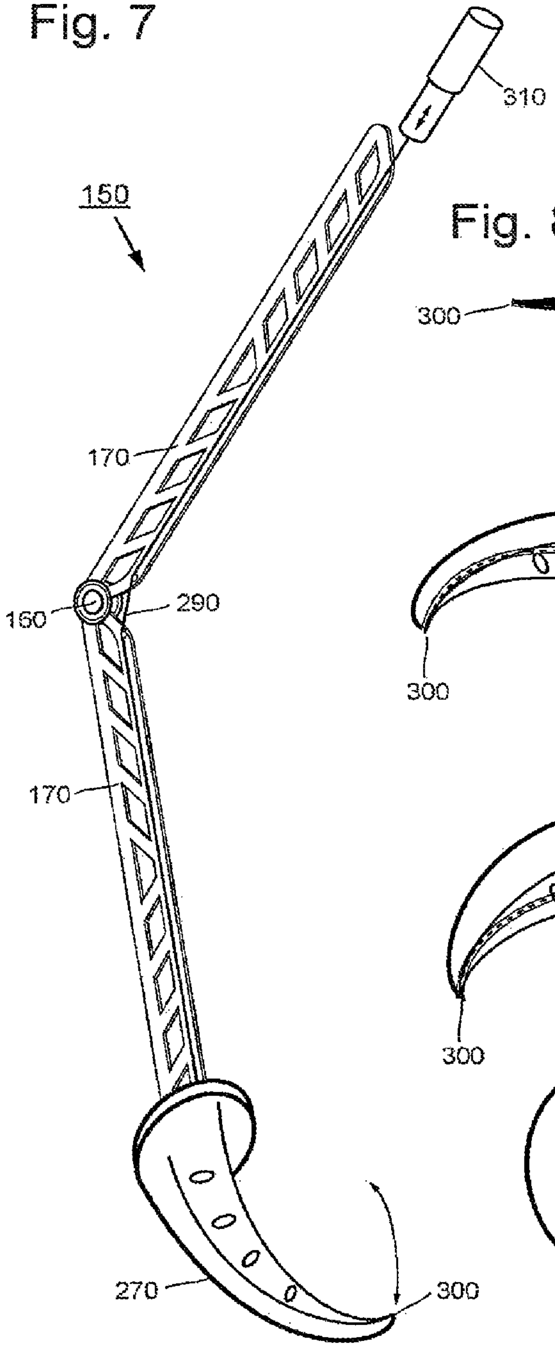
FIG. 7 shows a separated articulated limb of the drone according to the invention with a continuously movable single finger as a tool or gripping element, FIGS. 8.1 to 8.4 show a continuously movable single finger in different states of curvature, FIGS. 9.1 to 9.3 show a separated link of an articulated limb of the drone according to the invention with three different attachments, FIG. 9.4 show a separated link of an articulated limb of the drone according to the invention with visible interchangeable chuck.

FIG. 7 shows a separated articulated limb 150 of the drone 100 according to the invention with a continuously movable single finger as a tool 230 or gripping device 220. The articulated limb 150 in lightweight construction with perforated plates formed from aluminium sheet, which are reminiscent of a truss composite, cannot be gripped by any smaller objects. In order to teach the drone 100 to grip, it may be provided that an articulated limb 150 is connected via the interchangeable chuck 200 to that of a gripping device 220 in the form of a polymer extension 270. The polymer extension 270 is an elongated strip with a silicone-like or rubber-like embossing. Within the polymer extension 270, there is a channel 280 that is eccentric with respect to the longitudinal axis L. A steel core 290 extends in the channel 280. This is a fine, heavy-duty wire fixedly connected to the apex 300 of the polymer extension 270 on the inside. If the steel core 290 is pulled, for example, because the elongated steel core 290 is actuated by the interchangeable chuck 200, which in turn is actuated by a steel core through the articulated foot 150, the polymer extension 270 curves. The curvature of the polymer extension 270 is brought about by the eccentric course of the channel 280. A structure or depressions may be present on the inwardly curved side of the polymer extension 270. These act like a suction cup of an octopus when the polymer extension 270 is wrapped around an object for gripping and assist in firmly gripping an object.

Figure 8:
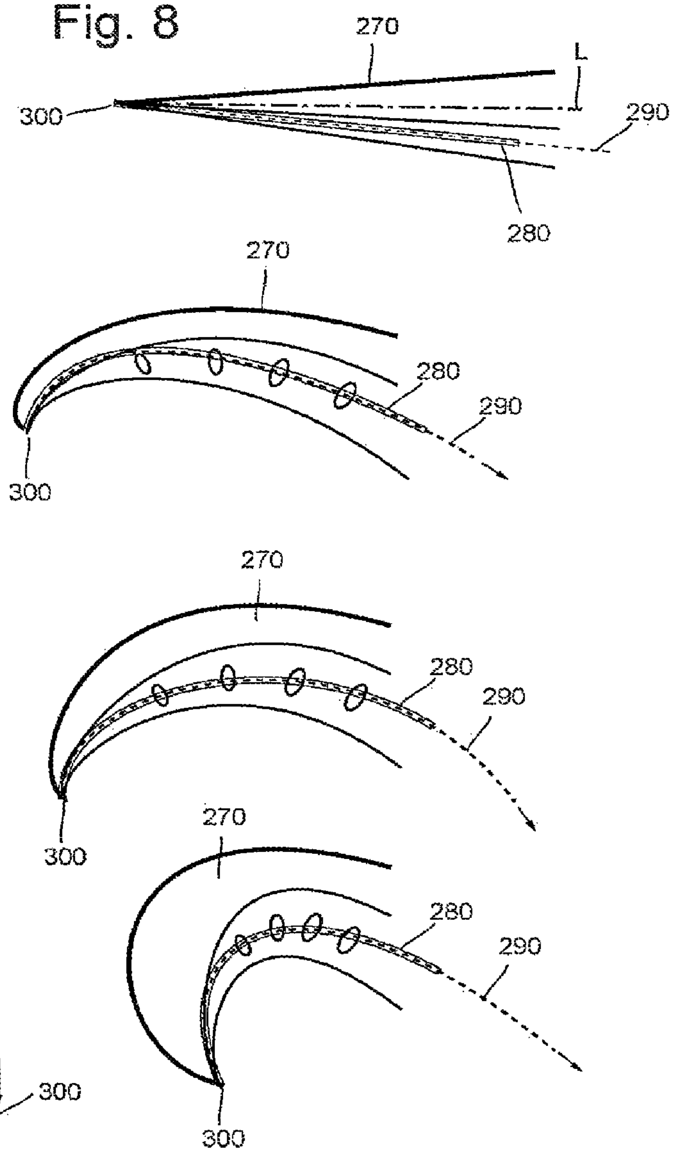

FIG. 8.1, FIG. 8.2, FIG. 8.3, and FIG. 8.4 show a continuously movable single finger in various states of curvature. In FIG. 8.1, the straight polymer extension 270 is shown in a partially perforated view. In relation to the longitudinal axis L, the channel 280 runs eccentrically, that is to say next to the longitudinal axis L. FIG. 8.2 shows an initially only slight curvature of the polymer extension 270, which is produced by pulling on the steel core 290. FIG. 8.3 shows an already greater curvature of the polymer extension 270, which is produced by further pulling on the steel core 290. Finally, FIG. 8.4 illustrates a strong curvature of the polymer extension 270 produced by continuous pulling on the steel core 290. Due to the curvature of the polymer extension 270, it is possible to grasp small objects securely. The grip is reinforced by a wetting, slightly hygroscopic surface of the silicone or rubber. Such surfaces are known as non-slip, adhesive surfaces made of everyday objects.

Figure 9:
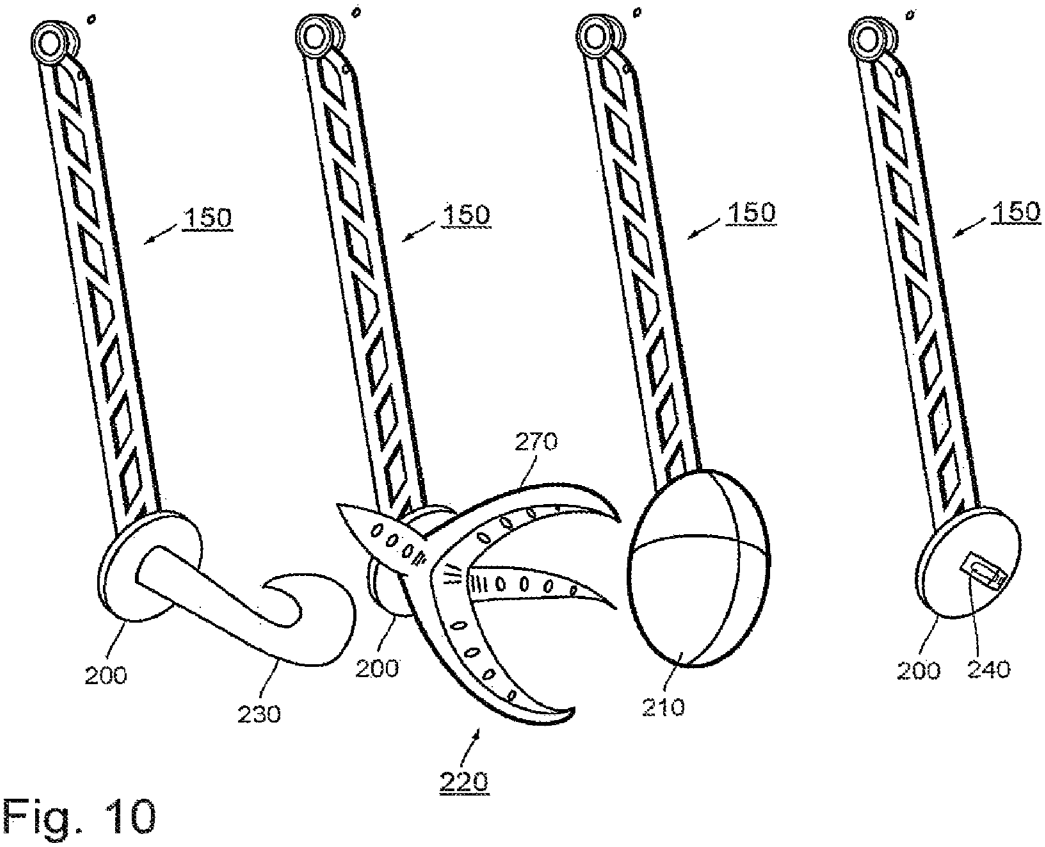

FIG. 9.1, FIG. 9.2, and FIG. 9.3 show a separated link of an articulated limb 150 of the drone 100 according to the invention with three different attachments. FIG. 9.1 shows a hook as an example tool that allows the drone 100 to attach to a corresponding protrusion. The example hook is versatile and can also be used to lift objects if the object has a corresponding hooking extension. FIG. 9.2 shows a gripping device with four polymer extensions 270 that can lift small objects like a bird's claw. FIG. 9.3 shows a sensor that looks like a cushion. A temperature probe and/or a humidity probe are located in the sensor. Through this sensor, a drone 100 can determine whether a surface is warm, for example, to detect the condition of objects.

FIG. 9.4 shows a separated link 170 of an articulated limb 150 of the drone 100 according to the invention with visible interchangeable chuck 200. The interchangeable chuck 200 has a parallelepipedal locking mandrel in which an electrical contact 240 is arranged. For this purpose, the distal end 190 of the at least one articulated limb 150 has an electrical contact 240 for connecting an accumulator 250 as part of the drone 100 to an external power source 260, such as mains power for charging the accumulator 250. The electrical contact 240 allows electrical connection to the accumulator 250 of the drone 100. It is possible to charge the accumulator 250 via this electrical contact 240. It is also possible to supply the drone 100 with electrical power if the drone 100 briefly changes its own accumulator 250 without its own power supply during an autonomous accumulator change.

Figure 10:
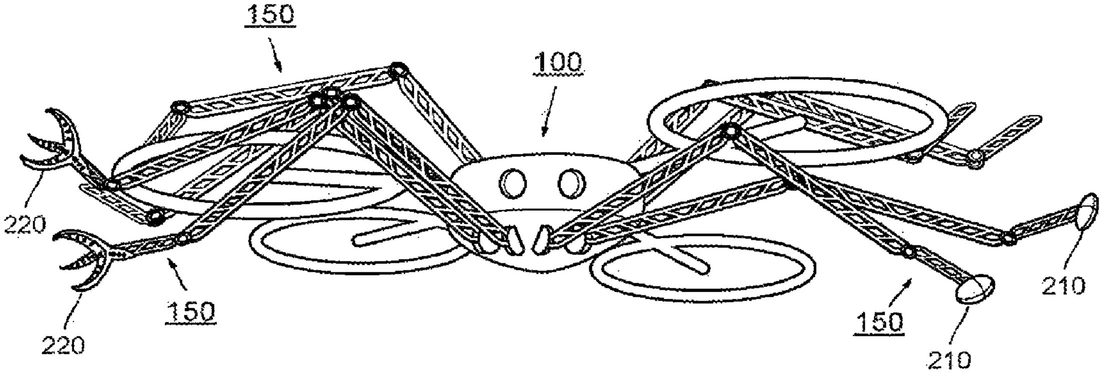
FIG. 10 shows the drone of FIG. 2 with gripping devices and sensory devices placed on some of the articulated limbs.

FIG. 10 shows the drone 100 of FIG. 2 with gripping devices 220 mounted on some of the articulated limbs 150 and sensory devices 240 in the crawling mode. The equipping of the articulated limbs with various tools can be varied as desired depending on the intended use.

Figure 11:
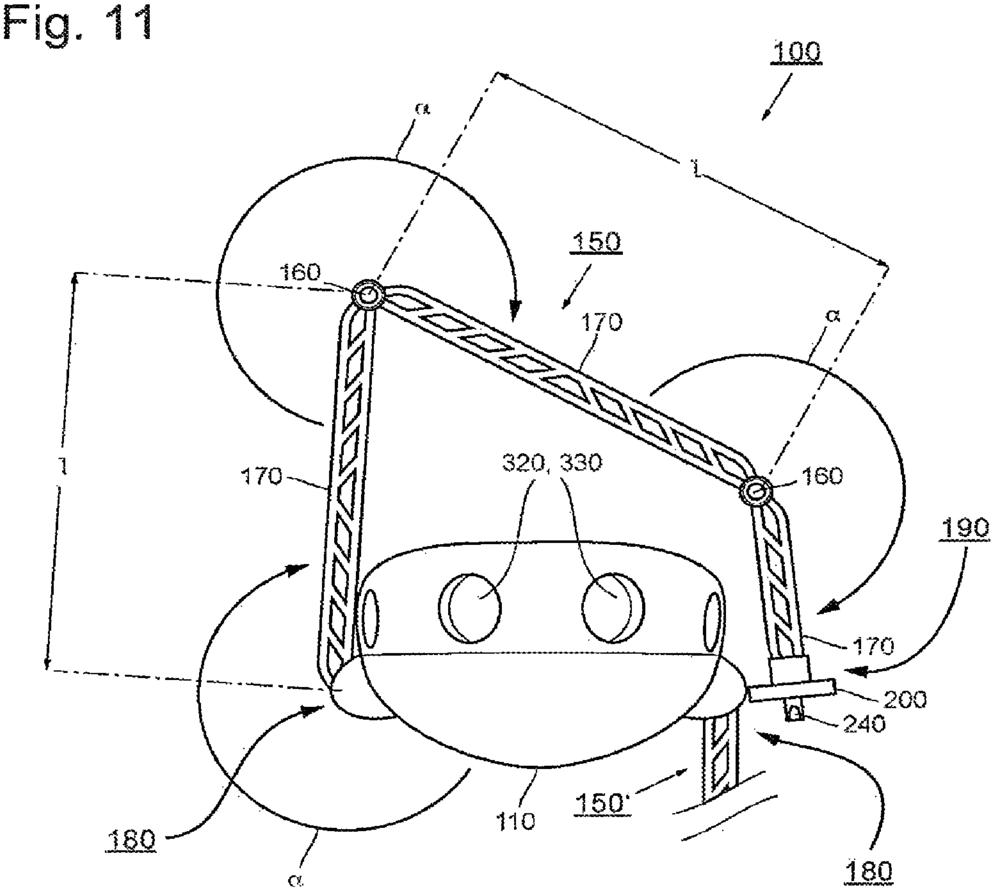
FIG. 11 shows a sketch illustrating preferred length and opening angle ratios for the drone according to the invention, FIGS. 12.1 to 12.5 show a detail of the view of a drone according to the invention in various states during an autonomous change of an accumulator.

FIG. 11 shows a sketch illustrating preferred length and opening angle ratios for the drone 100 according to the invention. Preferably, the articulated limbs 150 are elongated and narrow. The lengths l of individual links 170 and the opening angles $\alpha$ of the joints 160 of the articulated limbs 150, 150' in relation to the dimensions of the central body 110 are preferably dimensioned such that a distal end 190 of a first articulated limb 150 can be brought up to a proximal end 180 of a second articulated limb 150' opposite the first articulated limb 150. This definition is reminiscent of a physical school ability test for human children. The length and arrangement of the articulated limbs, as well as the opening angles of the joints 160 in the articulated limbs 150, contribute to a high deployment flexibility of the drone 100.

Figures FIG. 12.1, FIG. 12.2, FIG. 12.3, FIG. 12.4, FIG. 12.5 show a detail of the view of a drone 100 according to the invention in various states during an autonomous change of a rechargeable battery 250. To change an accumulator 250 located on or in the upward-facing back surface 340, the drone 100 brings an articulated limb 150 into engagement with its back, which engages with the interchangeable chuck 200 in a corresponding receiving socket in the accumulator 250, as shown in FIGS. 12.1 and 12.2. In order for the drone 100 to be able to autonomously change the accumulator 250, a further short-term accumulator may be present in the central body 110, or else, in order to avoid dead weight, it may be provided that the drone 100 receives electrical current with a further articulated limb 150 via the electrical contact 240 on the interchangeable chuck 200 of the respective articulated limb 150. The drone 100 then lifts the accumulator 250 from its position on or within the upwardly facing back surface 340. At this time, the drone 100 is dependent on the external power supply or the power supply of a short-term battery. The drone 100 can then pivot the accumulator 250 over the articulated limb 150 by moving the articulated limb 150 and also by moving its own central body 110. In this case, it may be possible to move the centre of gravity of the accumulator 250 only slightly and to move the articulated limbs 150 by pivoting about the centre of gravity of the accumulator 250. This technique is used in some industrial robots to save energy, but also to reduce the load on the joints. For this purpose, a control program may calculate a trajectory of the accumulator 250 corresponding to simple and three-dimensional Lissajous figures to avoid strong accelerations. This helps to avoid abrupt load changes, which extends the service life of the mechanism. FIGS. 12.4 and 12.5 show the final phases of the removal of the drained accumulator 250. In FIG. 12.5, the drone 100 places the accumulator 250 in a charging station 360 where another accumulator 250' is already charged and is waiting to be installed in the drone 100.

Figure 13:
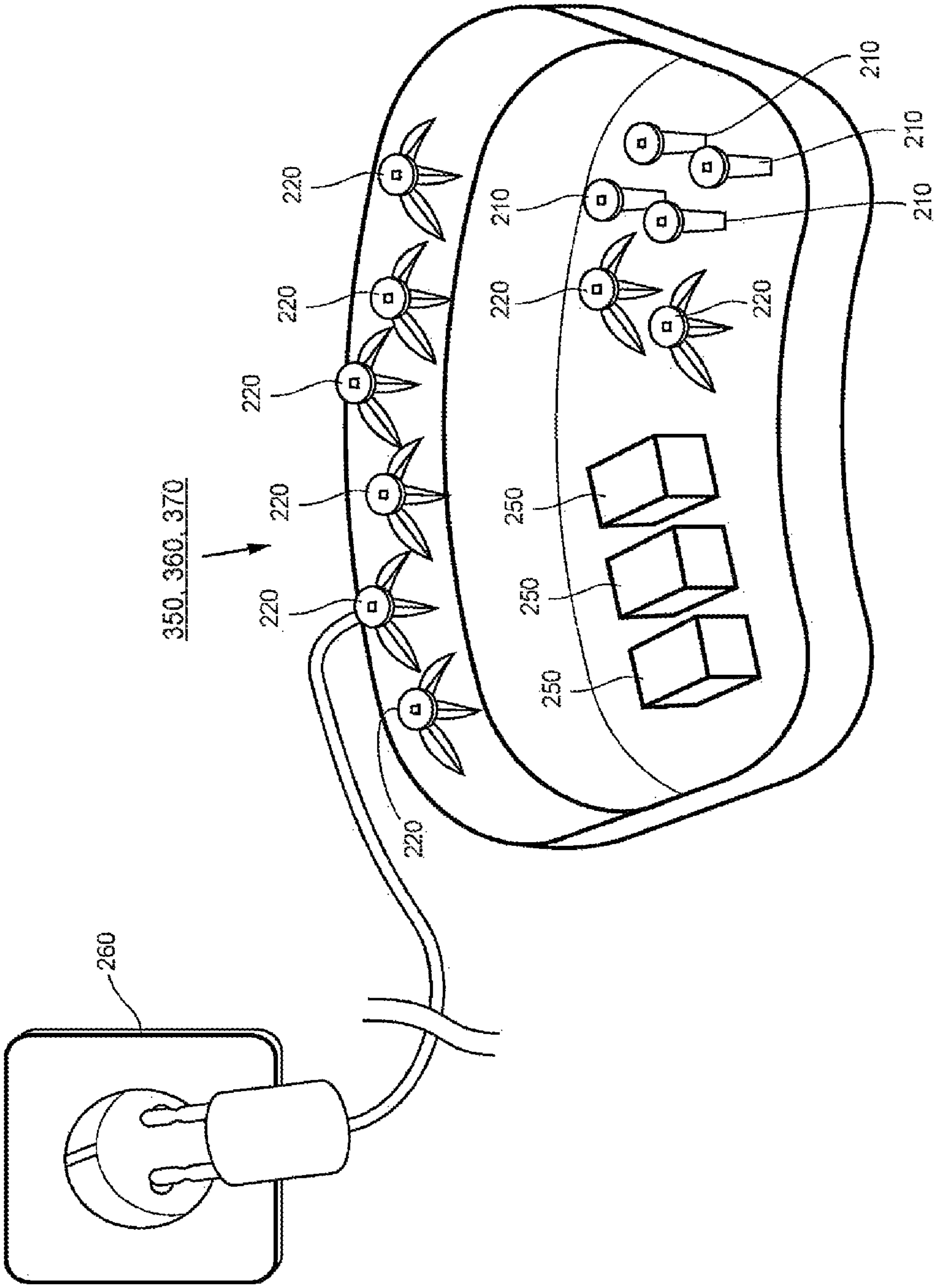
FIG. 13 shows a representation of a base station that acts as a charging device and as a radio relay station (router)

FIG. 13 shows an illustration of a base station 350 that acts as a charging device 360 and as a radio relay station 370 (router). This base station 350 may hold a battery of accumulators 250, gripping devices 220, sensory devices 210, and/or tools. By controlling a remote computer 380 as a control computer or host computer, the drone 100, controlled by the remote computer 380, may autonomously switch attachments to the interchangeable chuck 200.

Figure 14:
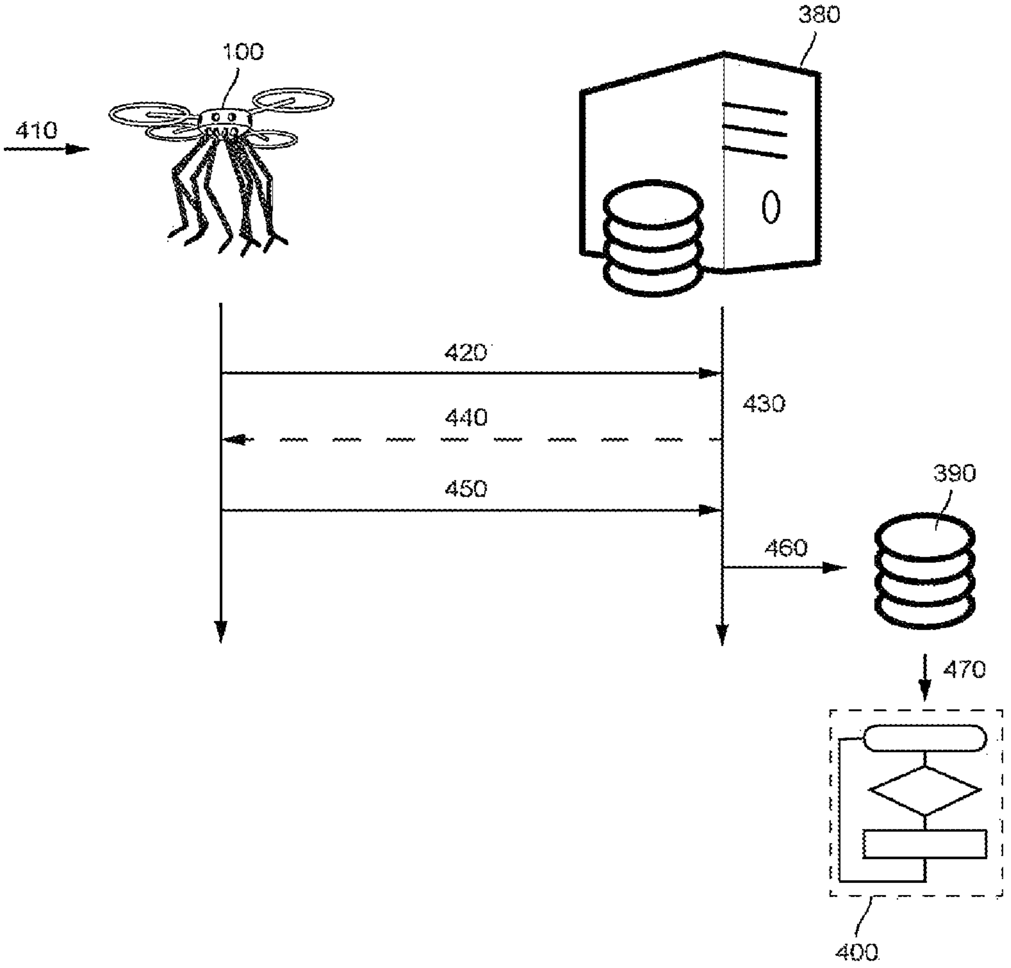
FIG. 14 shows a sketch to illustrate a protocol for communication with a remote computer as a control computer.

Finally, FIG. 14 shows a sketch illustrating a protocol for communicating with a remote computer 380 as a control computer as a method for controlling a drone. It begins with the acquisition 410 of sensory data by the drone 100. Sensory data are images, stereo images, lidar data, temperature, humidity, but if necessary also haptic data, which are recorded via a haptic sensor. This sensory data is then transmitted by sending 420 the sensory data by the drone 100 to a remote computer 380 together with a task. This can be, for example, the already described task of switching a washing machine or an electrical appliance on or off. A control instruction is then calculated 430 by the remote computer 380. The remote computer has artificial intelligence that learns through feedback. The remote computer sends (440) the calculated control information to the drone 100. The drone 100 attempts to execute the control commands and provides feedback. This is done by sending (450) control success data as feedback by the drone 100 to the remote computer 380. The feedback may be that a consequence of an effect suspected by the AI-algorithm is confirmed or denied. The AI-algorithm could give a control information, such as press button in position (x, y, z in the spatial direction of the three solid angles r, t, p). After pressing, the washing machine should suddenly be quiet. Whether this is the case, the drone 100 sends feedback back to the remote computer 380, which always refines its own AI-algorithm from this data. After the feedback, the control instruction and the corresponding control success data of the drone 100 are recorded 460 in a database 390 of a self-optimizing algorithm 400 in the remote computer 380, and the self-optimizing algorithm (AI-algorithm) 400 is adapted 470 for calculating control instructions in the remote computer 380. In the event of a request by another drone or the same drone, the adapted AI-algorithm can provide accurate control information.

The invention was demonstrated on the basis of an octapod, namely with 8 articulated limbs. In principle, tetrapods (4 articulated limbs), pentapods (5 articulated limbs), hexapods (6 articulated limbs), heptapods (7 articulated limbs), nonapods (9 articulated limbs) and decapods (10 articulated limbs) can also be considered. Dodecapods (12 articulated limbs) are also possible. The number of articulated limbs is determined by the tasks to be performed.

Figure 15:
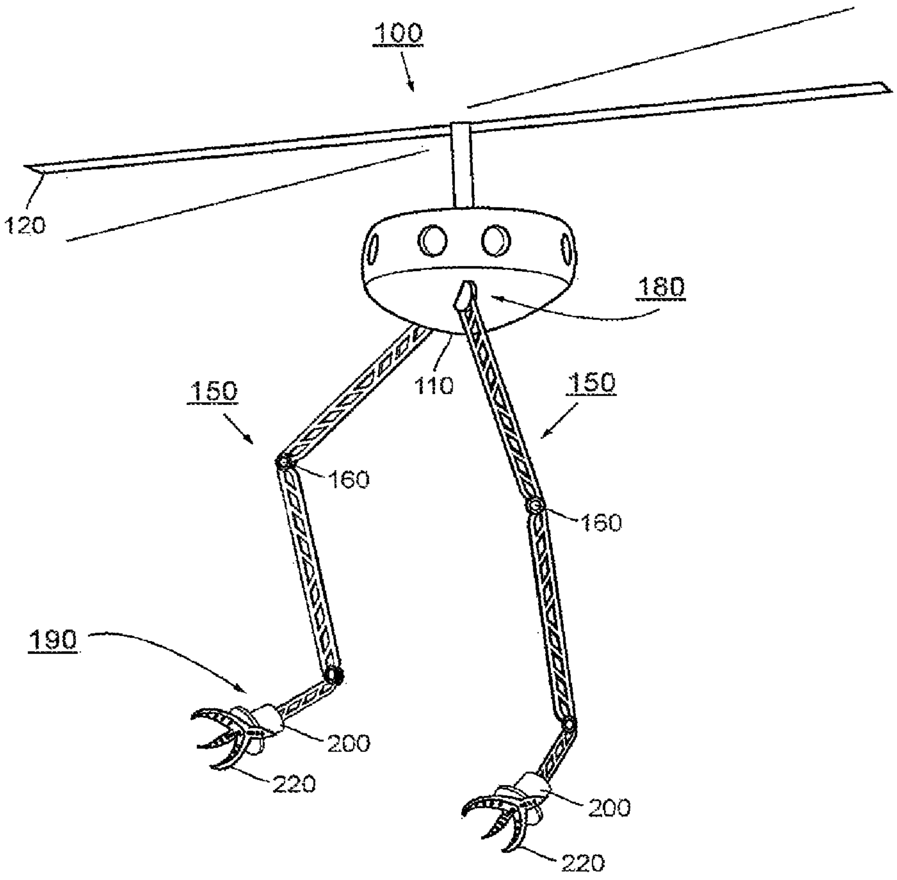
FIG. 15 shows a sketch of a single propeller drone with internal torque equalization with two articulated limbs.

Finally, FIG. 15 shows a single-propeller drone without a protective ring, which has a torque compensation present in the central body, which is represented by a mass rotating counter to the propeller. This drone has only two articulated limbs, but the drone can still run safely without having to balance, as the drone can support and stabilise itself against thrust with the effect of the propeller or a thrust element.

In the above-described embodiments, drones with propeller wings have been presented. Instead of the propeller wings, however, annular nozzles can also be used, which are blown on by a blower in the central body. Drones of this type are colloquially referred to as Dyson drones or jetstream drones, in reference to Dyson fans. These drones are characterised externally by a design without externally recognisable moving parts.

LIST OF REFERENCE NUMERALS

| | |
|---|---|
| 100 | Drone |
| 110 | Central body |
| 120 | Propeller wings |
| 130 | Suspension |
| 140 | Object |
| 150 | Articulated limb |
| 150' | Articulated limb |
| 160 | Joint |
| 170 | Link |
| 180 | Proximal end |
| 190 | Distal end |
| 200 | Interchangeable chuck |
| 210 | Sensory device |
| 220 | Gripping device |
| 230 | Tool |
| 240 | Electrical contact |
| 250 | Accumulator |
| 250' | Accumulator |
| 260 | External power source |
| 270 | Polymer extension |
| 280 | Channel |
| 290 | Steel Core |
| 300 | Apex |
| 310 | Actuator |
| 320 | Stereo camera |
| 330 | Lidar detection device |
| 340 | Back surface |
| 350 | Base station |
| 360 | Loading device |
| 370 | Radio relay device |
| 380 | Remote computer |
| 390 | Database |
| 400 | Algorithm |
| 410 | Record |
| 420 | Send |
| 430 | Calculate |
| 440 | Send |
| 450 | Send |
| 460 | Record |
| 470 | Adapt |
| α | Opening angle |
| A | Axis |
| L | Longitudinal axis |
| l | Length |
| S | Control device |
| W | Washing machine |

The invention claimed is:

1. A drone (100), comprising:

at least one central body (110), at least one thrust element, at least one articulated limb (150), wherein the at least one articulated limb (150) has links (170) connected via joints (160), wherein at least one articulated limb (150, 150') is connected in an articulated manner to the central body (110) via a proximal end (180), a distal end (190) of the at least one articulated limb (150, 150') has an interchangeable chuck (200), via which the distal end (190) of the articulated limb (150, 150') can be connected to a selection of sensory devices (210) and/or gripping devices (220) and/or tools (230), wherein the distal end (190) of the at least one articulated limb (150, 150') has an electrical contact (240), and wherein the interchangeable chuck (200) is configured to mechanically engage a corresponding socket on an accumulator (250) to enable the drone to autonomously replace the accumulator using the at least one articulated limb.

2. The drone according to claim 1, wherein at least one joint (160) of the at least one articulated limb (150, 150') has an opening angle (α) of more than 180°.

3. The drone according to claim 1, wherein the distal end (190) of the at least one articulated limb (150, 150') is connected to a gripping device (220) consisting of at least one silicone or rubber-elastic polymer extension (270), which has in its interior a channel (280) for a steel core (290) eccentric to the longitudinal axis (L), which is connected to the inner apex (300) of the polymer extension (270) and is led outwards through the eccentric channel (280), wherein the steel core (290) curves the polymer extension (270) via an actuator (310).

4. The drone according to claim 1, wherein the lengths (I) of individual links (170) and the opening angles (α) of the joints of the at least one articulated limb (150, 150') are dimensioned in such a way in relation to the dimensions of the central body (110), that a distal end (190) of a first articulated limb (150) can be brought up to a proximal end (180) of a second articulated limb (150) opposite the first articulated limb (150).

5. The drone according to claim 1, further comprising a control device (310) which can be connected and controlled via a radio link to a remote computer (380).

6. The drone according to claim 1, wherein the central body (110) has a stereo camera (320) and/or lidar detection device (330).

7. The drone according to claim 1, wherein an accumulator (250) is disposed on or in an upward-facing back surface (340) of the drone (100).

8. The drone according to claim 1, wherein the at least one thrust element consists of propeller wings (120), wherein the propeller wings (120) are suspended in rotation about axes (A) substantially parallel to each other, and wherein the suspensions (130) of the propeller wings (120) are rigidly connected to the central body (110).

9. The drone according to claim 1, wherein at least one annular thrust nozzle is blown from the central body by a central blower.

10. A set, consisting of:

a drone (100) according to claim 1, a base station (350) comprising:

a charging device (360) for electrically charging an accumulator (250), a radio relay device (router) (370), and a plurality of sensory devices (210) and/or gripping devices (220) and/or tools (230) for use on the drone (100).

11. A method of controlling a drone according to claim 1, the method comprising the steps of:

Recording (410) sensory data by the drone (100),

Sending (420) the sensory data by the drone (100) to a remote computer (380), Calculating (430) a control instruction by the remote computer (380), Sending (440) the control information by the remote computer (380) to the drone (100), Sending (450) control success data by the drone (100) to the remote computer (380), Recording (460) the control instruction and the corresponding control success data of the drone (100) in a database (390) of a self-optimizing algorithm (400) in the remote computer (380), and Adapting (470) the self-optimizing algorithm (400) to calculate control instructions in the remote computer (380).

12. The drone according to claim 1, wherein the interchangeable chuck (200) comprises a parallelepipedal locking mandrel, and wherein the electrical contact (240) is arranged within the parallelepipedal locking mandrel.

13. The drone according to claim 1, wherein the selection of gripping devices comprises a gripping device (220) connected to the interchangeable chuck (200), the gripping device comprises at least one silicone or rubber-elastic polymer extension (270), which has in its interior a channel (280) for a steel core (290) that is eccentric to the longitudinal axis (L) of the extension, and wherein the drone further comprises an actuator (310) configured to pull the steel core (290) to cause the polymer extension (270) to curve.

* * * * *